United States Patent [19]

Arnold et al.

[11] 4,169,979

[45] Oct. 2, 1979

[54] METHOD AND APPARATUS FOR MEASURING AZIMUTH AND SPEED OF HORIZONTAL FLUID FLOW BY A BOREHOLE

[75] Inventors: Dan M. Arnold; Obie M. Langford; Hans J. Paap; Hubert D. Scott, all of Houston, Tex.

[73] Assignee: Texaco Inc., White Plains, N.Y.

[21] Appl. No.: 815,964

[22] Filed: Jul. 15, 1977

[51] Int. Cl.² ............................................. G01V 5/00
[52] U.S. Cl. ..................................... 250/266; 250/270
[58] Field of Search ............... 250/264, 265, 266, 269, 250/270

[56] References Cited

U.S. PATENT DOCUMENTS

| | | | |
|---|---|---|---|
| 2,443,731 | 6/1948 | Herzog et al. | 250/265 |
| 2,909,661 | 10/1959 | Armistead | 250/265 |
| 2,967,933 | 1/1961 | Scherbatskoy | 250/265 X |
| 4,047,028 | 9/1977 | Arnold | 250/265 X |

*Primary Examiner*—Davis L. Willis
*Attorney, Agent, or Firm*—Carl G. Ries; Thomas H. Whaley; William J. Beard

[57] ABSTRACT

Formation fluid is activated by a neutron source. A cluster of three gamma ray detectors provides count rate data with the count values varying among the three detectors as dictated by the geometry of the cluster and the angle of displacement of the activated fluid between the time of neutron bombardment and that of gamma ray detection. Measurements at different time intervals following the activation of the fluid may also be interpreted in terms of the speed of horizontal fluid flow past the borehole.

30 Claims, 9 Drawing Figures

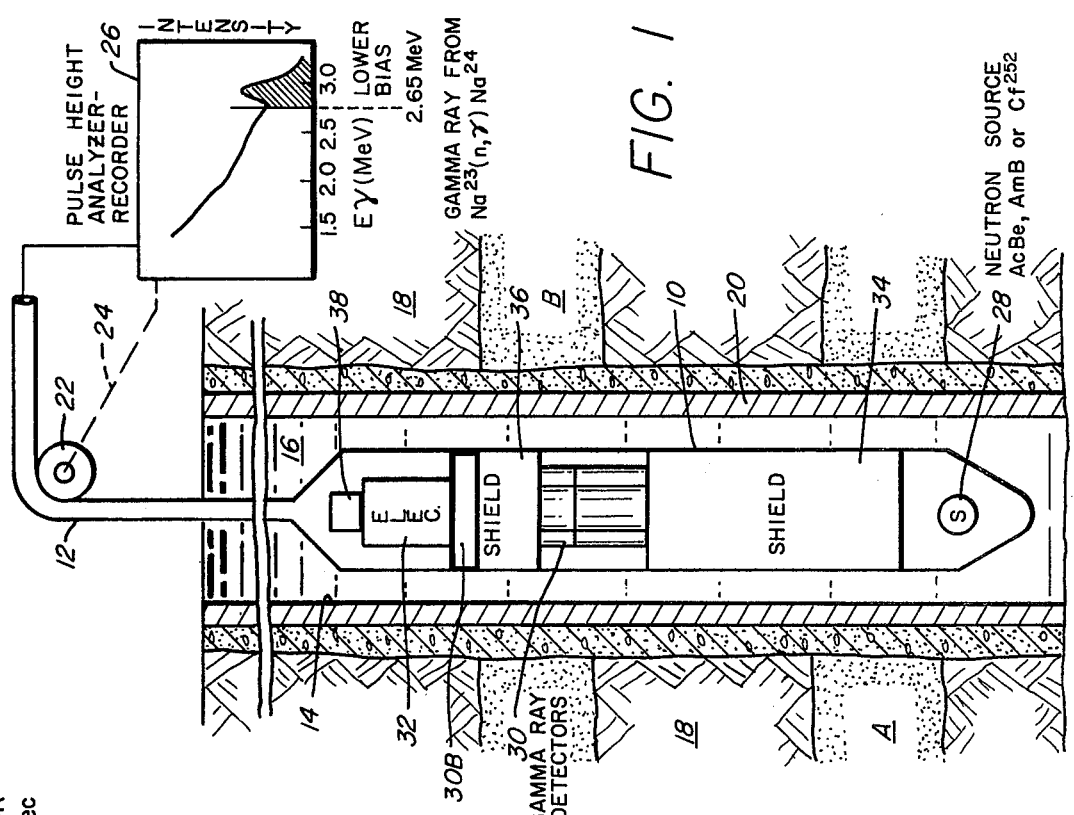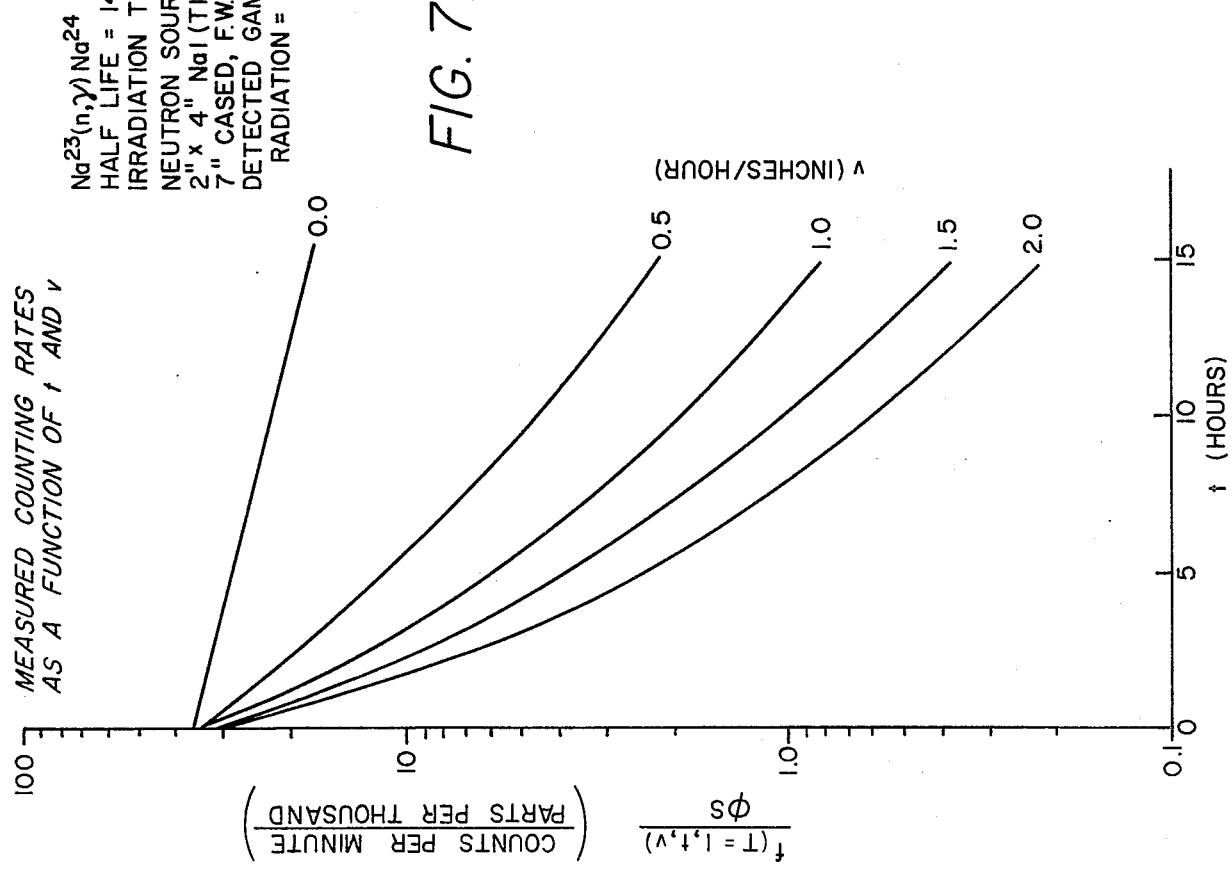

COUNT RATE vs. θ

ACTIVATION AND DECAY IN VOLUME ELEMENT

NOMOGRAPH FOR DETERMINING $v$ FROM $t_1$, $\Delta t$, AND $R$

METHOD AND APPARATUS FOR MEASURING AZIMUTH AND SPEED OF HORIZONTAL FLUID FLOW BY A BOREHOLE

BACKGROUND OF THE INVENTION

The present invention pertains to methods and apparatus for radioactive well logging. More particularly, the present invention relates to techniques for determining azimuth and speed of horizontal fluid flow in earth formations in the vicinity of a well borehole by the employment of neutron activation and the analysis of resultant gamma radiation produced by the activated fluid.

In secondary and tertiary recovery of petroleum deposits, many of the recovery techniques employ the injection of water or chemical solutions into the earth formations comprising the reservoir from injection wells. In planning the recovery operation, the injection of water or chemicals has, in the past, been limited by certain assumptions and/or approximations concerning the mobility of fluid in the formation comprising the reservoir. Crucial factors in such fluid injection programs include the vertical conformity of the producing formation as well as the horizontal permeability and uniformity. In some reservoirs, formation lensing or horizontal partitioning by permeability barriers, such as faults, can occur. In such instances, apparently correlevant intervals of permeability may be separated from one well to another in the field by such formation lensing or permeability barriers being interposed across the interval of formation between the wells.

It is therefore apparent that some knowledge of the existance of such lensing or permeability barriers could prevent the injection of large amounts of costly chemicals or water into a recovery pattern in which formation continuity between injection wells of a field is partially or totally absent. This could prevent the expenditure of large sums of money, time and effort and a fruitless project to recover secondary or tertiary problem deposits.

Information concerning such structure of the earth formation may be obtained by an evaluation of the direction and speed of formation fluid flow by a borehole in the field. Also, by obtaining such speed and direction of flow measurements at a sufficient number of boreholes throughout the field, a mapping of the total flow throughout a petroleum reservoir may be obtained to help in the operational planning of injection of chemicals or water to assist in determining optimum withdrawal rates. Moreover, a knowledge of the lateral water flow characteristics of a particular formation in a producing field can help greatly in understanding of the reservoir dynamics of the particular reservoir being produced.

It is sometimes desirable in a reservoir with multiple producing intervals for a reservoir engineer to be able to delineate those producing zones which provide the most water influx or water drive to the production of petroleum. The mapping of lateral water movement in all zones both above and below the expected water table in the producing formation should supply this information.

Reservoir engineers have been provided with relatively few and often inaccurate well logging instruments to determine the vertical conformance characteristics of the earth formations comprising a reservoir. As a result, they have suffered from inadequate information concerning the properties of the earth formations making up the reservoir. Radioactive tracer studies of the movement of fluids in the vicinity of a well borehole can be misleading in this respect because of the lack of uniform absorption of the tracer element into the flowing stream of formation water. Also, it is difficult to provide tracer isotopes with sufficient half life to be injected in an injection well, and observe their movement days or even weeks later at a monitoring or producing well in order to obtain some idea of the lateral flow, speed or velocity of fluids in the formations comprising the reservoir.

SUMMARY OF THE INVENTION

Apparatus of the present invention includes a sonde, or downhole well logging tool, equipped with a neutron source. A cluster of three gamma ray detectors is longitudinally displaced, and shielded, from the neutron source within the sonde. The gamma ray detectors may typically be scintillation crystals coupled to photomultiplier tubes. The cylindrical crystals are positioned equidistant along the sonde from the location of the neutron source, with their axes of cylindrical symmetry parallel to the longitudinal axis of the sonde and symmetrically disposed about that axis. Appropriate power supplies and data reduction equipment are provided. As an alternative, an additional, lone gamma ray detector may be positioned within the sonde, displaced from the detector cluster, or a separate, single-detector sonde may be used in conjunction with the first sonde equipped with the detector cluster.

In a method of the present invention, the sonde is lowered within a well borehole until the neutron source is level with a formation whose fluid characteristics are under investigation. The area is irradiated by the neutron source for a given time interval, then the sonde is lowered beyond the depth of the irradiated formation. With the cluster of gamma ray detectors operational, the sonde is slowly raised through the irradiated formation, with each detector in the cluster providing an output signal in the form of voltage pulses whose magnitudes correspond to the energy of gamma rays incident upon the detector crystal. The count rates given in the detectors by the flowing fluid are anaylzed and compared, with the azimuthal angle of the flow of the formation fluid relative to a fiducial direction referenced to the detector cluster being determined by the relative count rates from the three detectors. A gyrocompass, or other appropriate instrumentation, may be provided to indicate the fiducial direction.

The counting rate of decay of the radioactive isotope produced in the formation fluid may be interpreted in terms of the flow speed of the formation fluid in the vicinity of the borehole. Two or more logging passes may be made through each irradiated zone to obtain tracer isotope decay data for this purpose. Appropriate techniques for reducing the analyzing such data to obtain flow speed values are discussed in U.S. patent application Ser. No. 698,394, filed June 21, 1976.

BRIEF DESCRIPTION OF THE DRAWINGS

FIG. 1 is an illustration showing schematically a well logging sonde, positioned within a borehole, for horizontal fluid flow detection according to the present invention;

FIG. 7 is a graphical representation illustrating the measured counting rates as a function of time and a speed of horizontal fluid movement of fluid in the vicinity of a well borehole;

DESCRIPTION OF PREFERRED EMBODIMENTS

Figure 2:
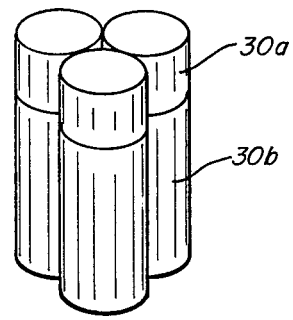
FIG. 2 is a schematic perspective view of the detector cluster used in the sonde.

Apparatus of the present invention is shown schematically in FIGS. 1 and 2. A downhole sonde 10 is shown suspended by a well logging cable 12 in a well borehole 14 which is filled with borehole fluid 16 and surrounded by earth formations 18. The well 14 may be lined with casing 20 cemented in place as shown. The cable 12 passes over a sheave 22 which is mechanically or electrically linked, as indicated by the dotted line 24, to a recorder 26 so that measurements from the downhole sonde 10 may be recorded as a function of depth in the well borehole 14. A neutron source 28 is positioned within the lower end of the sonde 10 for use in radiating formation fluid. The source 28 may be a continuous chemical neutron source such as an actinium berylium source, or a californium 252 source.

Toward the opposite end of the sonde 10 from the source 28 is a cluster of three gamma ray detectors 30 of equal size and sensitivity. Each detector, for example, may be a sodium iodide, thallium-activated scintillation crystal 30a optically coupled to a photomuliplier tube 30b, as indicated in FIG. 2. As is well known, gamma rays entering such a crystal interact therewith to produce light flashes, or scintillations, whose intensity is functionally related to the gamma ray energy. The light flashes are then detected by the photomuliplier tube to generate voltage pulses proportional in magnitude, or height, to the intensity of the corresponding light flashes. Thus, a succession of pulses is produced by the detector, wherein each pulse height is proportional to the energy of the corresponding incident gamma ray. The pulse streams from each detector in the cluster 30 may be received by appropriate information processing equipment included in an electronic package 32 positioned toward the top of the sonde 10. Thus, the three sets of pulse streams from the three detectors may be multiplexed or similarly encoded by transmission schemes conventional in the art to provide for transmission along a conductor within the logging cable 12 to the well surface. At the surface the unified signal is demultiplexed or decoded with the three data pulse streams separated and identified with the corresponding detectors for further data reduction as described hereinafter. It will also be appreciated that appropriate power sources (not shown) may be provided at the surface and connected to the downhole electronic equipment in the package 32 by appropriate conductors within the logging cable 12 in order to supply operational power for the electronic package as well as the detector cluster 30. As an alternative, power supplies may be included within the electronic package 32. Details of such power supply arrangements and appropriate couplings are not illustrated, as these are conventional in the art.

The space between the neutron source 28 and the detector cluster 30 in the downhole sonde 10 is occupied by shielding material 34 of suitable type to prevent direct irradiation of the detector crystals 30a with high energy neutrons from the neutron source. Shielding materials with high hydrogen content, such as paraffin or other polymolecular hydrocarbon structure, may be utilized for this purpose. The high hydrogen content serves to slow down or rapidly attenuate the neutron population from the neutron source, and prevent this thermalized neutron population from reaching the vicinity of the detector crystals. To this end, strong thermal neutron absorbers such as cadmium may be interposed in layers with the hydrogenate shielding material in order to make up the shield portion 34. Additional shielding 36 may be positioned between the detector cluster 30 and the electronic package 32 to further protect the latter and to provide a horizontal "focussing" effect to the detector response.

The present invention employs the downhole production of radioactive isotopes within the formation fluids in the vicinity of the well borehole 14. For example, the radiation of water in the vicinity of the borehole with high energy neutrons having energy in excess of approximately 10 MEV can result in the creation of the radioactive isotope nitrogen 16 by the nuclear reaction $O^{16}(n,p)N^{16}$. If the formation fluid is saline in nature, the radioactive isotope sodium 24 can be produced by radiating the earth formation with neutrons which are slowed to thermal energy and captured by the more common isotope sodium 23 comprising NaCl in solution according to the nuclear reaction $Na^{23}(n,\gamma)Na^{24}$. The sodium 24 isotope then decays by the emission of gamma radiation of 2.75 MEV energy. Thus, the detector cluster 30 detects the presence and intensity of such gamma emission.

The pulse streams from the detectors may be passed through a downhole comparator appropriately biased to reject all voltage pulses of height corresponding to gamma rays of less than 2.65 MEV before the information signals are carried to the surface. A pulse height analyzer incorporated with the recorder 26 at the surface, for use in data reduction as described hereinafter, may also be used to reject voltage pulses corresponding to gamma radiation of less than 2.65 MEV.

Where the neutron bombardment occurs in limestone formations, calcium 49 is also formed, and emits 3.09 MEV gamma rays. However, since the half life of calcium 49 is approximately nine minutes, the effect of this isotope may be avoided if radiation measurements are delayed even a short time from the end of the irradiation time interval. All other significant quantities of naturally occurring gamma rays from radioactive isotopes which may be produced in earth formations using the chemical type neutron source 28 have characteristic energies below 2.65 MEV. Thus, by use of the 2.65 MEV threshold, the radiation detected and counted may be limited, for practical purposes, to that generated by the decay of the unstable radioactive isotope sodium 24.

The sonde 10 is also equipped with a gyrocompass device 38 of the type known in the art for use in directional drilling surveys. The purpose of the gyrocompass 38 is to identify the orientation of the sonde 10 and, therefore, the detector cluster 30 with respect to a reference direction such as North when gamma ray count data is being acquired. Since the present invention will most generally be used in wells which are cased with steel casing, a conventional magnetic compass would not be appropriate for this purpose.

Figure 3:
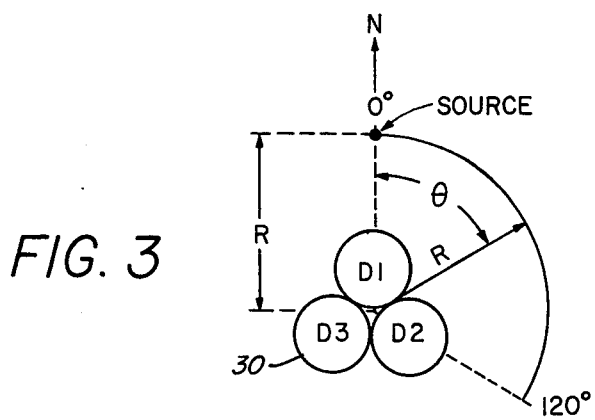
FIG. 3 is a plan view of the detector cluster, identifying a fiducial direction.

FIG. 3 shows a top view of the detector cluster 30, in which the detectors are identified as D1, D2 and D3. The detectors form a triangle, with the apex at detector D1 aligned with the fiducial direction North. Azimuthal angles are indicated in a clockwise sense from North. The position of a radiation source in the plane of the crystals of the detector cluster 30 may be identified by a combination of radius R and azimuthal angle θ values.

Figure 4:
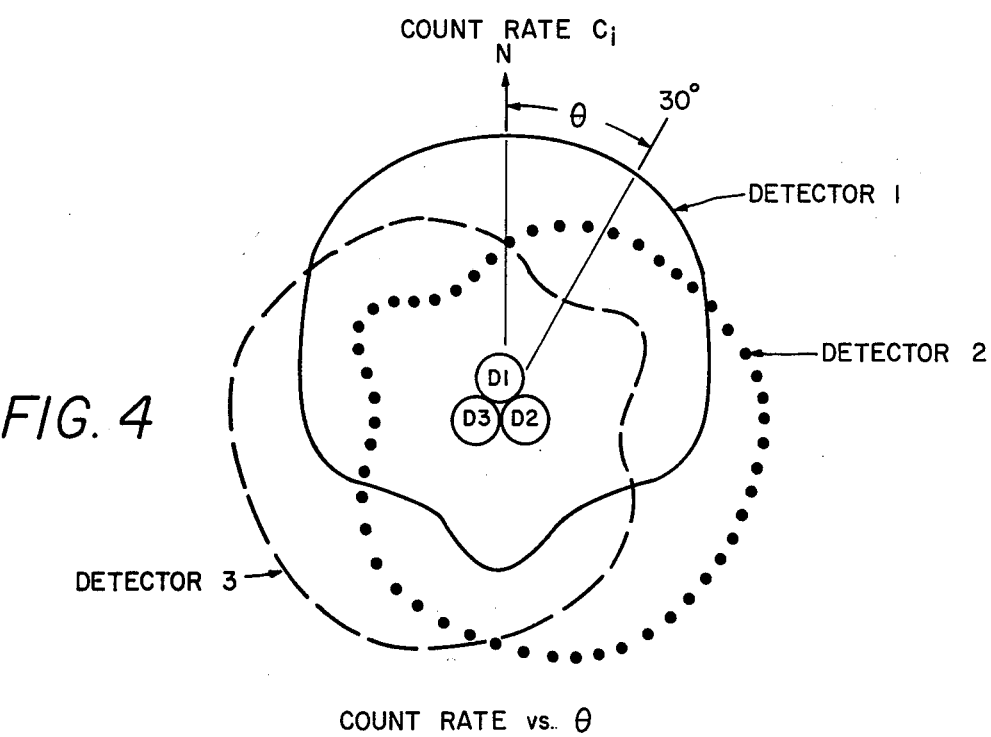
FIG. 4 is a polar coordinate graph, centered on the detector cluster, illustrating the variation of count rate, for each detector, as a function of azimuthal angle.

For a given gama ray source positioned at (R,θ), the counting rates generated by each of the three detectors are, in general, different. The difference in counting rates is due to the varying distances between the radiation source and the individual detectors as well as the shielding effect produced by the detectors on each other. In FIG. 4 are plotted three graphs in polar coordinates with origin at the center of the detector cluster. Each of the graphs represents counting rate values for a particular detector for a given source as positioned at all azimuthal angles through 360° at constant value R. Thus, the solid line represents the counting rate values for detector D1; the dotted line corresponds to values measured by detector D2; and the dashed line represents values measured by detector D3. It will be appreciated that, in view of the symmetries exhibited by the counting rate curves in FIG. 4, the azimuthal angle θ for the position of a radiation source may be determined from counting rate values obtained by the three detectors of the cluster 30. For any given case, the counting rate values will all depend on the distance R of the source from the center of the detector cluster. However, it has been found that the parameters $d_i$, defined by Equation 1, are relatively independent of R.

$$d_i = \frac{C_i}{\sum_{i=1}^{3} C_i} \times 100 \quad (i = 1,2,3) \tag{1}$$

where $C_i$ represents the measured counting rate from detector i. Thus, the azimuth of the radiation source can be determined from the computed values $d_i$.

The counting rates $C_i$ may be transmitted to the surface in the form of pulse streams from the three detectors in the cluster 30 are discussed hereinbefore. At the surface, the quantities $d_i$ may be obtained with the use of a general purpose digital computer of the type PDP11 manufactured by Digital Equipment Corporation of Maynard, Massachusetts, or in any other appropriate fashion. As an alternative, the values $d_i$ may be obtained be appropriate electronics within the package 32 in the sonde 10 and then transmitted to the surface for further processing.

Figure 5:
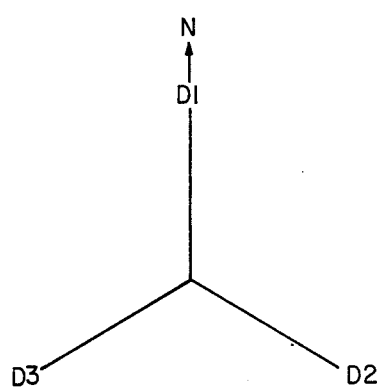
FIG. 5 illustrates a triangular coordinate system centered on the detector cluster.

In FIG. 5 is illustrated a triangular coordinate system with axes identified as $d_i$, $d_2$ and $d_3$ aligned along the radially outward directions through the centers of the corresponding detectors D1, D2, D3, respectively. Again, detector D1 and, therefore, axis $d_i$, are aligned with the fiducial direction of North. If the values $d_i$ for a given position of a radiation source are plotted along the corresponding axes in FIG. 5, the resultant obtained by adding the three values $d_i$ vectorially then possesses the same azimuthal angle as the radiation source.

Consider an underground formation containing saline water that has been irradiated for a period of time by the neutron source 28. If the water is not moving, the values of the parameters $d_i$ obtained with the use of the gamma ray detector cluster 30 would be the same. If, however, the water were moving during the period of radiation by the neutron source 28, then the measured values $d_i$ would be different, indicating that the center of the seqment of irradiation water has moved off in some direction identifiable by azimuthal angle θ. The value of θ may be determined as described hereinbefore, and the horizontal flow direction known. Variations in gamma ray activity may also be used to determine the speed of the horizontal flow of the saline water, as described in the aforementioned patent application. Thus, if the formation fluid is not in motion, the observed decrease in activity with time t will follow the exponential decay $e^{-\lambda t}$ wherein λ is the decay constant of the induced radioactivity. However, if the fluid is in motion in a horizontal direction relative to the borehole 14, the observed decrease in activity will be due to the exponential decay characteristic plus an additional decrease due to the motion of the radioactive particles from the vicinity of the detector cluster 30 by the moving fluid.

Figure 6:
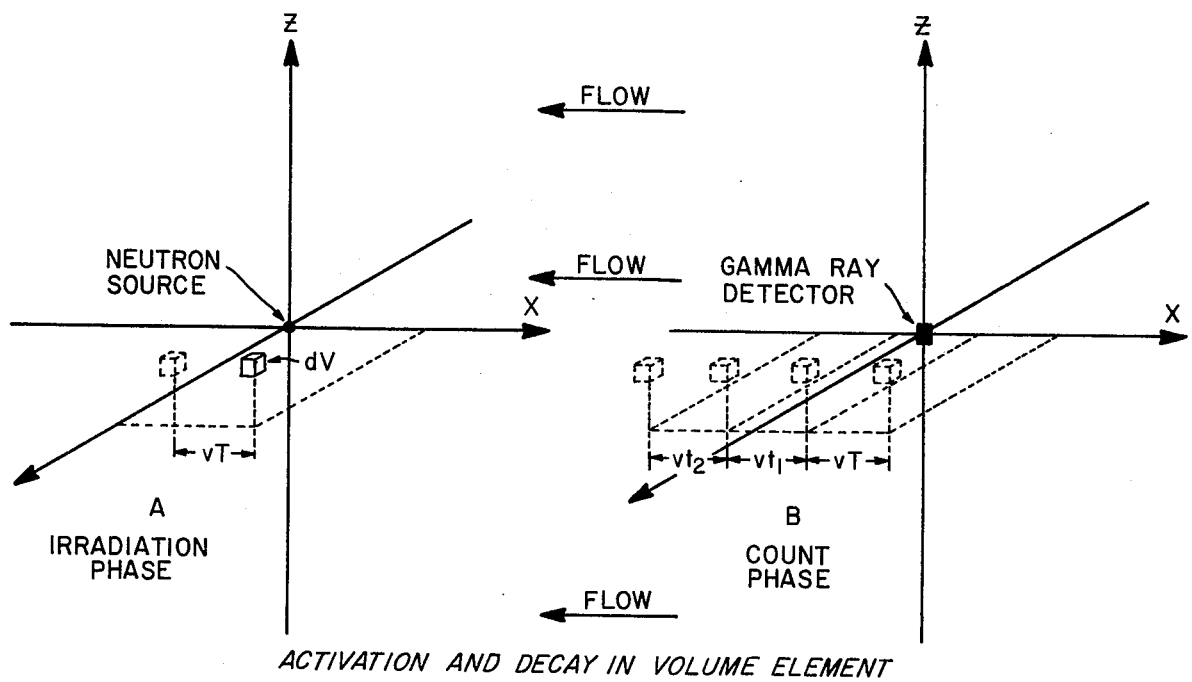
FIG. 6 is a schematic drawing illustrating the geometry of the neutron activation and radioactive decay of a small volume element of formation fluid.

With reference to FIG. 6, consider a point neutron source positioned at the origin x=y=z=0 of the coordinate axes of the figure within a flowing fluid having a linear velocity v in the minus x direction of the coordinate system. Then, if this fluid is irradiated with neutrons for a time interval T, the gamma ray activity induced within a small volume element dV whose position is (x,y,z) at the beginning of the neutron radiation is given by the expression of Equation 2.

$$dA(T,v,x,y,z) = \frac{A_o \Sigma dV}{4\pi} \lambda e^{-\lambda T} \int_0^T \psi(t) e^{\lambda t} dt \tag{2}$$

where
$A_o$ = neutron source strength in neutrons/sec,
λ = decay constant of the radioactive isotope of interest, and
$\Sigma = N_o \rho \sigma p_i / 100 \, M_i$
where
$N_o$ = Avogadro's number,
ρ = the density of the liquid,
σ = the cross-section for the radiation producing the radioactive isotope of interest,
$p_i$ = the percentage abundance of the target isotope within the liquid, and
$M_i$ = the atomic weight of the target isotope.

In Equation 2 the term Ψ represents the thermal neutron flux distribution for a two neutron group diffusion model, and is given by the expression of Equation 3 as follows:

$$\psi = \frac{((x - vt)^2 + y^2 + z^2)^{-\frac{1}{2}}}{S_2(L_1^2 - L_2^2)} \cdot \{e^{-((x - vt)^2 + y^2 + z^2)^{\frac{1}{2}}/L_1} - e^{-((x - vt)^2 + y^2 + z^2)^{\frac{1}{2}}/L_2}\} \tag{3}$$

where
$S_2$ = the slowing down power, $L_1$ = the diffusion length for the first neutron group (fast neutrons), and
$L_2$ = the diffusion length for the second group (thermal neutrons).

If the neutron source is then removed and a gamma ray detector is positioned at $x=y=z=0$ of the coordinate axes as is illustrated in FIG. 6, the induced radioactivity from the volume element dV registered within the detector at some time t measured from the end of the irradiation time interval T is given by the expression of Equation 4:

$$df(T,t,v,x,y,z) = F_\gamma \frac{dA(T,v,x,y,z)e^{-\gamma t}}{4\pi} \cdot \frac{e^{-\mu((x-v(t+T))^2 + y^2 + z^2)^{\frac{1}{2}}}}{(x-v(t+T))^2 + y^2 + z^2} \quad (4)$$

where
$E_\gamma$ = the efficiency of the detector for the gamma radiation of interest, and
$\mu$ = the linear attenuation coefficient for the gamma radiation of interest.

Now substituting Equation 2 into Equation 4 and integrating over all volume elements dV, the total radioactivity registered by a detector at time t is obtained by the expression of Equation 5 as follows:

$$f(T,t,v) = \frac{\lambda A_o E_\gamma \Sigma_e - \lambda(t+T)}{(4\pi)^2} \int_x \int_y \int_z \left\{ \int_o^T e^{\lambda + \psi dt} \right\} \cdot \frac{e^{-\mu((X-v(t+T))^2 + y^2 + z^2)^{\frac{1}{2}}}}{(X-v(T+t))^2 + Y^2 + z^2} dxdydz \quad (5)$$

Equation 5 can be integrated numerically in order to evaluate the integral term thereof.

If it is now assumed (1) that the fluid is contained in a permeable formation of porosity $\phi$, (2) that the reaction of interest is only the $Na^{23}(n,\gamma)Na^{24}$ reaction having a half life of approximately 14.9 hours, and (3) that all of the sodium contained in the formation is contained in the formation fluid in the form of sodium chloride, then the term $\Sigma$ of Equation 5 can be expressed in terms of $\phi$, the porosity and S, the salinity of the formation fluid. FIG. 7 shows the general form of the function $f(T,t,v,)\phi S$ as a function of time t for the 2.75 MEV gamma radiation from the reaction $Na^{23}(n,\gamma)Na^{24}$. In FIG. 7 the constants of Equation 4 are taken to be as follows:
$\lambda = 0.0465$ hours $^{-1}$,
T = 1.0 hour,
$A_o = 10^8$ nuetrons/second,
S = is the salinity of the formation fluid in parts per thousand (ppt) sodium chloride, and
$\phi$ = the formation porosity (fractional).

The remaining constants in Equation 5 for the function $f(T,t,v)$ are obtained from the normalization of data taken in controlled test formations with known borehole conditions. Data taken in a cased fresh water filled 7 inch borehole and using a 2 inch by 4 inch thallium activated sodium iodide scintillation counter crystal was used in obtaining the curves of FIG. 7. While the data of FIG. 7 were obtained using a single gamma ray detector, the summation of values $C_i$ for the three detectors of the cluster 30 may be used in the present case to effect data reduction for determing flow speed. As alternatives, the detector cluster 30 may be replaced by a single detector (not shown), or an additional detector 30b may be added to the sonde, longitudinally displaced from the cluster, to obtain data for fluid flow speed determination.

In FIG. 7 it can be observed that the decay rate at zero velocity is a straight line on the logarithmic scale of the presentation of the figure. The family of curves below the zero velocity curve show the affect of the linear velocity of the flowing fluid on the decrease in counting rate as a function of time for the values of the constants chosen in this representation.

It will be shown subsequently that a knowledge of S and $\phi$ is not required in order to obtain v the linear flow speed in the horizontal direction. These quantities do, however, affect the recorded counting rates which in turn affect the statistical accuracy of the computed quantity v, the linear flow speed in the horizontal direction. It will be appreciated by those skilled in the art that the graphical illustration of FIG. 7 represents one configuration of assumptions pertaining to the formation porosity and salinity of the formation fluids, but that other similar relationships may be obtained for different values of water salinity, porosity and detector efficiencies and neutron source strength by the same process of the evaluation according to Equation 5 of these different parameters.

By using FIG. 7, estimates of the counting rate of gamma rays from the decay of the radioactive sodium 24 under field conditions may be obtained. For example, in a formation having a porosity of 30% which is saturated with 100 parts per thousand sodium chloride water which is moving horizontally at a linear velocity of $\frac{1}{2}$ inch per hour, a counting rate recorded at t=2 hours after the termination of a T=1 hour irradiating period can be shown to be approximately 645 counts per minute. This counting rate would be adequate to provide accurate measurement of the linear flow velocity in a horizontal direction with sufficient statistical accuracy to insure usefulness of the measurement.

Consider two earth formations A and B penetrated by the well borehole 14 as shown in FIG. 1. To determine the speed and direction of fluid flow, if any, in either of these two formations, a logging operation according to the present invention may be initiated by first positioning the neutron source 28 within zone A and irradiating this zone, for example, for approximately 1 hour with neutrons. The irradiation time interval may be varied and can generally be less than 1 hour if the salinity of the formation, or the strength of the neutron source, is adequate. Once zone A has been irradiated for the desired time interval, the logging sonde 10 is raised to position the neutron source 28 adjacent zone B. Zone B is then also irradiated for the specified time interval with neutrons.

Figure 8:
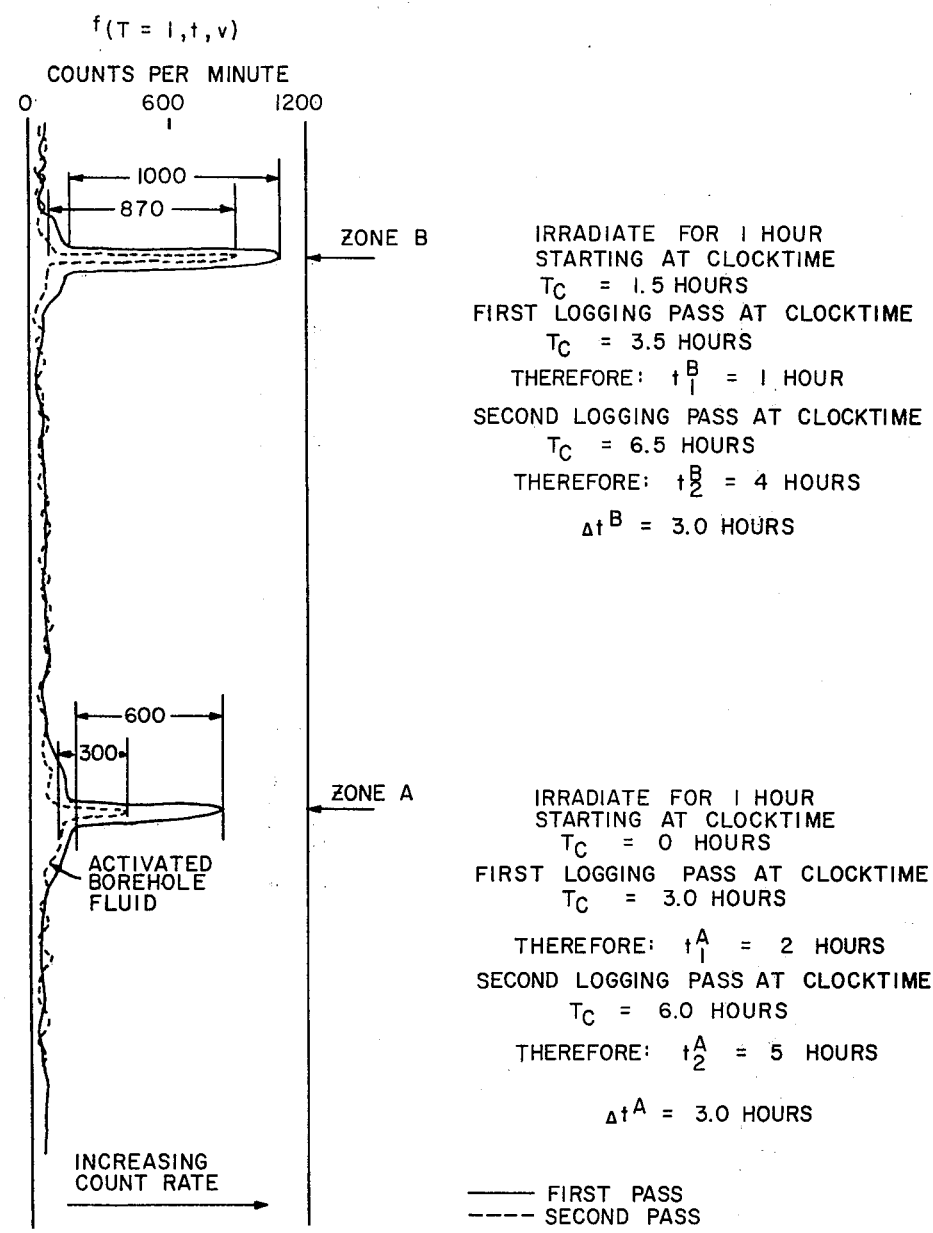
FIG. 8 is a graphical illustration showing a well log according to the present invention.

Following the irradiation of zone B, the logging sonde 10 is lowered below zone A, and a continuous logging operation is initiated in which the sonde is slowly raised through zone A. During this pass through zone A, the gamma ray detector cluster 30 is operational, and count rate curves, such as shown in FIG. 8, may be acquired for each of the three detectors in the cluster. As noted hereinbefore, the individual count rates from the three detectors in the cluster 30 will differ where the sources of the detected gamma ray emissions are moving. Hence, the count rate values recorded for the individual detectors in the cluster 30 at any given level within a zone containing flowing fluid will, in general, be different.

For each zone A and B, the three sets of pulse streams generated by the detectors of the cluster 30 are analyzed as discussed hereinbefore. Thus, for a given level within a zone containing fluid under investigation, three values $d_i$ are determined and mutually compared to identify the azimuthal angle of the fluid flow direction relative to the fiducial direction North. For each level at which such azimuthal angle information is obtained, the count data may be further analyzed to determine the speed of the fluid flow. As noted hereinbefore, the counts from the three detectors in the cluster 30 may be added to treat the cluster as a single detector for this purpose, or an additional lone detector may be provided in the sonde 10 for this purpose. As an alternative, a separate sonde with a single detector my be employed.

To evaluate the speed of fluid flow in the two zones A and B, multiple logging passes of each zone may be employed. As indicated in FIG. 8, a different count rate curve may be expected for each logging pass through a zone due to a movement of the radiating isotopes between passes. The time $t_1^A$ at which the detector portion of the sonde 10 passes zone A, measured from the end of the irradiation of zone A, is recorded. Similarly, the time $t_1^B$ at which the detector passes the activated region of zone B is measured from the end of the irradiation of zone B and is also recorded. Corresponding times $t_2^A$ and $t_2^B$ are also recorded to mark the second pass of the detector through each zone.

During the neutron activation phase, sodium 24 will also be produced within the borehole fluid 16 if the fluid is saline. However, during the subsequent movement of the sonde 10, this activated borehole fluid 16 will be effectively dispersed up and down the borehole 14 by the movement of the well logging sonde. It has been found in usage that this dispersal of the borehole fluid 16 is adequate to insure a reduction of the background due to sodium 24 produced in the borehole 14 below a harmful level.

The background count level shown in FIG. 8 is representative of this background sodium 24 produced in the activated borehole fluid 16. As may be seen in FIG. 8, such background radiation is not sufficient to cause confusion between the sharp peaks occurring at the irradiated points of zones A and B.

In order to detect the horizontal flow rates it is only necessary to observe the relatively sharp spikes in the depth logs of FIG. 8 and to relate these to the nomograph of FIG. 9, as described hereinafter. From the example log shown in FIG. 8, the irradiation peak on the first logging run through zone A is approximately 600 counts per minute, while the irradiation peak on the second logging run is approximately 300 counts per minute. For zone A also, $t_1^A = 2$ hours and $\Delta t_A$, the elapsed time between the second logging run and first logging run past zone A, is three hours. Thus, the ratio of counting rates in zone A, $R_A$, is 2.0 for this example.

For zone B, the counting rate on the first logging pass is approximately 1,000 counts per minute, while the counting rate on the second logging pass is approximately 870 counts per minute. For these two logging passes $t_1^B = 1$ hour and the elapsed time $\Delta t_B$ between logging passes equal three hours. Thus, the ratio of the count rate on the two logging passes through zone B, $R_B$ is 1.15.

Figure 9:
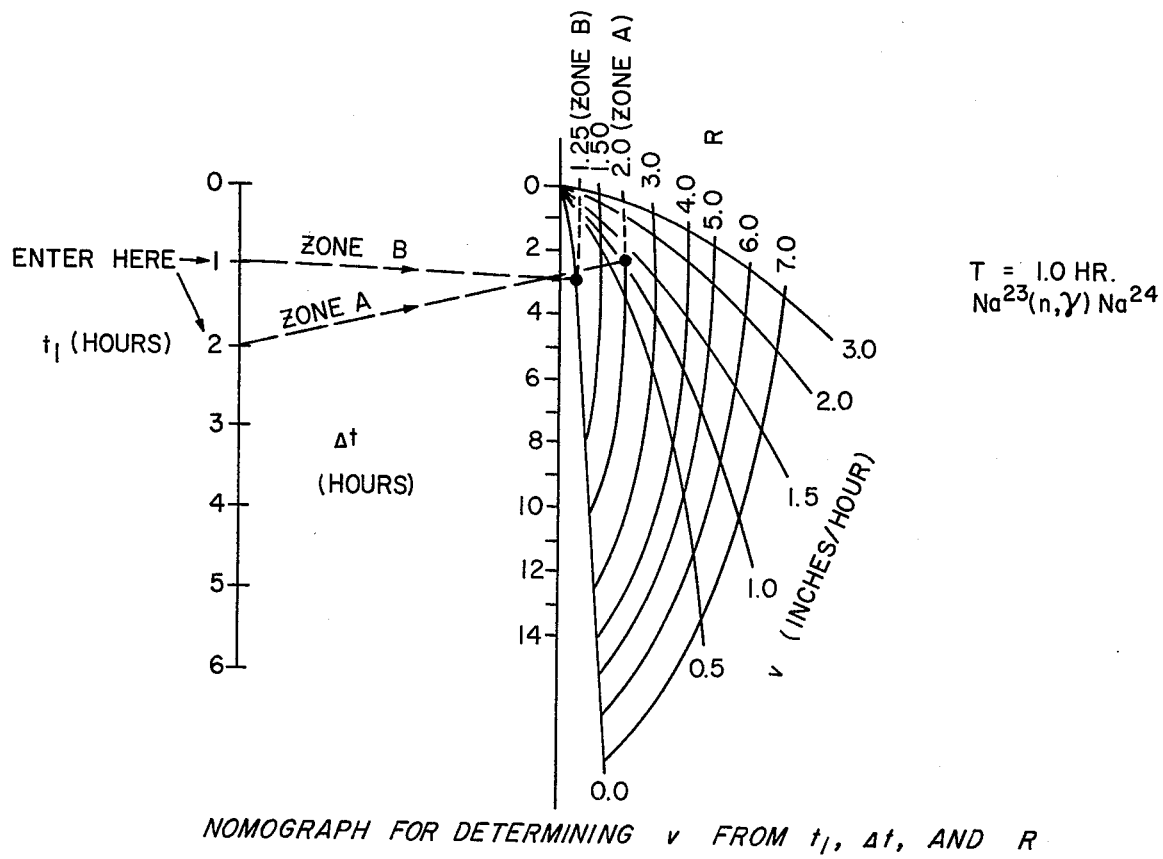
FIG. 9 is a nomograph for interpreting the radiation measurements to determine the speed of fluid flow in the vicinity of a well borehole.

A nomograph constructed from the data plotted in FIG. 7 is illustrated in FIG. 9 in which it is possible to calculate the linear flow rate in the horizontal direction past the irradiated zones. For zone A, a point is obtained on the first line at the left of the nomograph which corresponds to $t_1^A = 2$ hours. A second point on the second vertical axis to the right is obtained by the value of $\Delta t_A$ which, in this case, equals three hours. A straight line through these two points intersects the curve drawn to the right corresponding to the value of the ratio of counts for the particular measurement (in this case $R_A = 2.0$). The point of intersection indicates that the velocity of horizontal flow which would produce this ratio corresponding to the measurement time intervals is approximately 1.0 inches per hour. Following the same procedure and entering the values of $t_1^B = 1$ hour and $\Delta t_B = 3$ hours for zone B determines that a ratio of 1.15 is indicative of zero horizontal flow through zone B during the time following the radiation intervals.

The nomograph described with respect to FIG. 9 represents one method of interpretating the measurements performed with the well logging system of FIG. 1. It will be appreciated by those skilled in the art however that this nomograph, or other techniques which are analogous to the solution of the equations involved, may be programmed for use on a general purpose digital computer rather than being interpreted by the hand calculation technique according to the nomograph of FIG. 9. For example, the nomograph of FIG. 9 could be entered in tabular form in the memory of a general purpose digital computer. Appropriate interpolation and extrapolation techniques may be used to obtain the solutions corresponding to the measurement quantity. This type of solution would be apparent to those skilled in the art when presented with the nomograph of FIG. 9 or a nomograph corresponding to the calibration characteristics of a particular sonde.

The sodium 24 tracer which is produced in situ by the neutron irradiation according to the technique of the present invention is an ideal tracer isotope for relatively slow horizontal flow rates because of its long half life of about 14.9 hours and the relatively high energy gamma radiation which it emits upon its decay. If it is desired however to measure water flow rates which are relatively fast (on the order of feet per minute) it could be necessary to use a shorter lived tracer such as nitrogen 16 which has a half life of approximately 7.2 seconds. In such an instance, it would be necessary to utilize a deuterium-tritium accellerator type neutron source rather than a chemical neutron source due to the fact that the $o^{16}(n,p)N^{16}$ reaction has a 10 MEV threshold energy. In this instance, however, the same theory and logging techniques which have been previously discussed with respect to the use of sodium 24 tracer could also be applied using the nitrogen 16 tracer.

The foregoing disclosure and description of the invention is illustrative and explanatory thereof, and various changes in the method steps as well as in the details of the illustrated apparatus may be made within the scope of the appended claims without departing from the spirit of the invention.

We claim:
1. Well logging apparatus comprising:
 (a) an elongate sonde;
 (b) a neutron source within said sonde;
 (c) a gamma ray detection assembly within said sonde, including three gamma ray detectors displaced equidistant from said neutron source longitudinally along said sonde and disposed symmetrically about the longitudinal axis of said sonde; and
 (d) an additional gamma ray detector within said sonde displaced longitudinally along said sonde from said three gamma ray detectors and said neutron source and disposed generally along a longitudinal axis of said sonde.

2. Well logging apparatus as defined in claim 1 wherein said gamma ray detectors each comprise a scintillation crystal optically coupled to a photomultiplier tube.

3. Well logging apparatus as defined in claim 2 further comprising data reduction means for processing gamma ray count information from said gamma ray detectors.

4. Well logging apparatus as defined in claim 3 wherein said data reduction means comprises:
 (a) means for analyzing said gamma ray count information according to the energy of gamma rays counted; and
 (b) means for limiting the processing of gamma ray count information to that corresponding to gamma rays within a selected energy range.

5. Well logging apparatus as defined in claim 4 wherein said data reduction means futher comprises:
 (a) means for encoding gamma ray count information signals from said gamma ray detectors for transmission to the surface; and 6. Well logging apparatus as defined in claim 1 further comprising shielding means within said sonde, positioned between said neutron source and said gamma ray detection assembly.

7. Well logging apparatus as defined in claim 6 further comprising direction indication means for identifying the direction of orientation of said gamma ray detection assembly.

8. Well logging apparatus as defined in claim 7 wherein said direction indication means comprises a gyrocompass.

9. Well logging apparatus as defined in claim 1 further comprising shielding means within said sonde, positioned between said neutron source and said gamma ray detection assembly.

10. Well logging apparatus as defined in claim 1 further comprising direction indication means for identifying the direction of orientation of said gamma ray detection assembly.

11. Well logging apparatus as defined in claim 10 wherein said direction indication means comprises a gyrocompass.

12. A method for determining the characteristics of flow of earth formation fluid, moving in a horizontal direction past a borehole, comprising the steps of:
 (a) irradiating the formation fluid with neutrons from a neutron source positioned within the borehole;
 (b) providing an assembly of three gamma ray detectors wherein each of said three gamma ray detectors may be disposed at the same level within said borehole with said three gamma ray detectors arranged symmetrically about said borehole;
 (c) exposing said detectors to radiation from the neutron-irradiated formation fluid by positioning said assembly within said borehole at the level of said formation fluid to acquire count rate data from each detector; and
 (d) comparing said count rate data from said three detectors to determine the direction of movement of said fluid past said borehole during the time between said neutron-irradiation and said acquisition of count rate data.

13. A method as defined in claim 12 wherein the step of exposing said detectors to radiation from the neutron-irradiated formation fluid is accomplished by moving said assembly of detectors along said borehole through the area of the irradiated formation fluid while said detectors are operational to so acquire said count rate data.

14. A method as defined in claim 13 further comprising the additional step of analyzing said gamma ray count data according to the energy of gamma rays counted.

15. A method as defined in claim 14 further comprising the additional step of limiting the comparing of said gamma ray count data to that corresponding to gamma rays within a selected energy range.

16. A method as defined in claim 15 wherein the step of irradiating said formation fluid effects production of the isotope sodium 24 in said formation fluid.

17. A method as defined in claim 15 wherein the step of irradiating said formation fluid effects production of the isotope nitrogen 16 in said formation fluid.

18. A method as defined in claim 12 further comprising the additional steps of:
 (a) providing means for identifying the direction of orientation of said assembly of detectors relative to said borehole; and
 (b) so determining the direction of movement of said fluid by identifying said direction of movement relative to said assembly of detectors and, therefore, relative to said borehole.

19. A method as defined in claim 12 further comprising the additional steps of:
 (a) exposing said detectors to radiation from said neutron-irradiation formation fluid a second time to acquire second count rate data; and
 (b) combining count rate data from both said exposures according to a predetermined relationship to determine the flow speed of said formation fluid past said borehole.

20. A method as defined in claim 19 further comprising the additional step of analyzing said gamma ray count data according to the energy of gamma rays counted.

21. A method as defined in claim 20 further comprising the additional step of limiting the comparing of said gamma ray count data to that corresponding to gamma rays within a selected energy range.

22. A method as defined in claim 21 wherein the step of irradiating said formation fluid effects production of the isotope sodium 24 in said formation fluid.

23. A method as defined in claim 21 wherein the step of irradiating said formation fluid effects production of the isotope nitrogen 16 in said formation fluid.

24. A method as defined in claim 19 wherein the steps of exposing said detectors to radiation from the neutron-irradiated formation fluid are accomplished by moving said assembly of detectors along said borehole through the area of the irradiated formation fluid while said detectors are operational to so acquire said count rate data.

25. A method as defined in claim 19 further comprising the additional steps of:
 (a) providing means for identifying the direction of orientation of said assembly of detectors relative to said borehole; and
 (b) so determining the direction of movement of said fluid by identifying said direction of movement relative to said assembly of detectors and, therefore, relative to said borehole.

26. A method as defined in claim 12 further comprising the additional steps of:
  (a) providing an additional gamma ray detector;
  (b) moving said additional gamma ray detector along said borehole through the area of the irradiated formation fluid to acquire first additional count rate data;
  (c) waiting a selected length of time and then again moving said additional gamma ray detector through said area for acquiring second additional count rate data; and
  (d) combining said first and second additional count rate data according to a predetermined relationship to determine flow speed of said formation fluid past said borehole.

27. A method as defined in claim 26 further comprising the additional step of analyzing said gamma ray count data according to the energy of gamma rays counted.

28. A method as defined in claim 27 further comprising the additional step of limiting the comparing of said gamma ray count data to that corresponding to gamma rays within a selected energy range.

29. A method as defined in claim 28 wherein the step of irradiating said formation fluid effects production of the isotope sodium 24 in said formation fluid.

30. A method as defined in claim 28 wherein the step of irradiating said formation fluid effects production of the isotope nitrogen 16 in said formation fluid.

* * * * *

UNITED STATES PATENT AND TRADEMARK OFFICE
CERTIFICATE OF CORRECTION

PATENT NO. : 4,169,979
DATED : October 2, 1979
INVENTOR(S) : Dan M. Arnold et al.

It is certified that error appears in the above—identified patent and that said Letters Patent is hereby corrected as shown below:

Column 11, after line 24, insert -- (b) means for decoding said encoded gamma ray count information signals at the surface for further processing. --.

Signed and Sealed this

Fourteenth Day of April 1981

[SEAL]

Attest:

RENE D. TEGTMEYER

Attesting Officer

Acting Commissioner of Patents and Trademarks